United States Patent [19]

Levine

[11] 4,280,378
[45] Jul. 28, 1981

[54] SKI SHARPENER

[76] Inventor: Abraham I. Levine, 28 Wilson Ave., Rowayton, Conn. 06853

[21] Appl. No.: 108,657

[22] Filed: Dec. 31, 1979

[51] Int. Cl.³ ...................... B21K 17/00; B23D 67/12
[52] U.S. Cl. ..................................................... 76/83
[58] Field of Search .................. 76/83, 88, 82.1, 82.2; 51/205 WG; 280/809

[56] References Cited

U.S. PATENT DOCUMENTS

| 3,585,880 | 6/1971 | Kabriel | 51/205 WG |
| 3,875,825 | 4/1975 | Buttafuoco | 76/83 |
| 3,899,942 | 8/1975 | Bradbury | 76/88 |
| 3,991,429 | 11/1976 | Honauer | 76/83 |
| 4,121,484 | 10/1978 | Gorlach | 76/83 |

Primary Examiner—Roscoe V. Parker
Attorney, Agent, or Firm—Arthur T. Fattibene

[57] ABSTRACT

A ski sharpener for simultaneously honing the vertical and horizontal surfaces of a ski edge which comprises a base member having a base portion and a connected side portion disposed at right angles to provide a support or base against which a plurality of file sections are longitudinally and vertically spaced to provide an intermittent filing surface in two planes disposed normal to one another whereby the intermittent filing surfaces are arranged to simultaneously engage the vertical and horizontal surfaces of a ski edge in a honing operation. In one form of the device the ski sharpener is provided with one set of intermittent filing surfaces, and in another form the ski sharpener is provided with a plurality of sets of intermediate filing surfaces whereby the degree of coarseness of each set varies.

6 Claims, 4 Drawing Figures

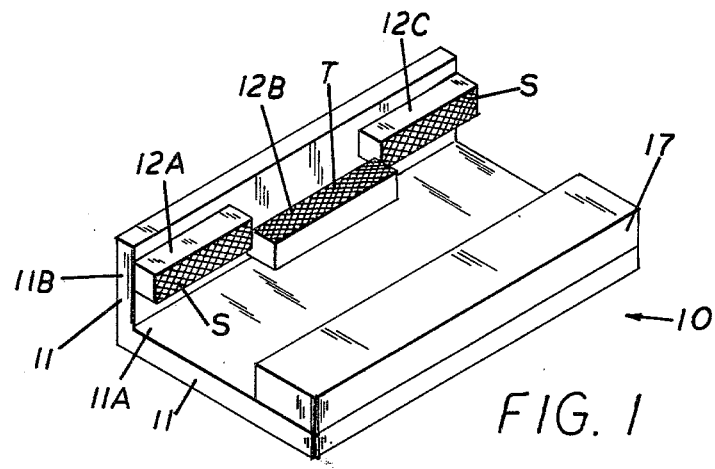
FIG. 1
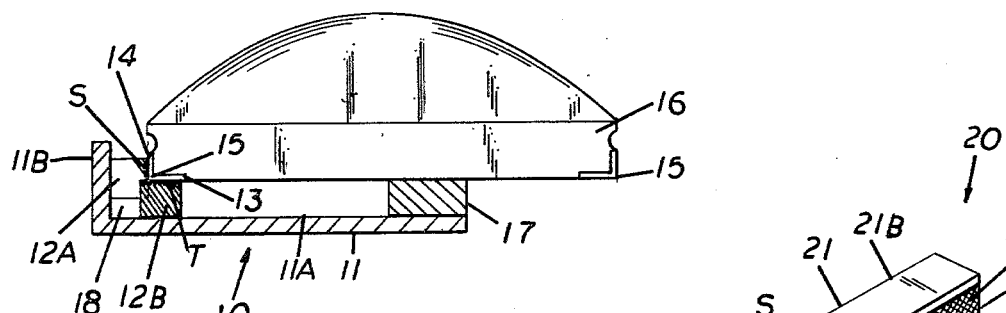
FIG. 2
FIG. 3
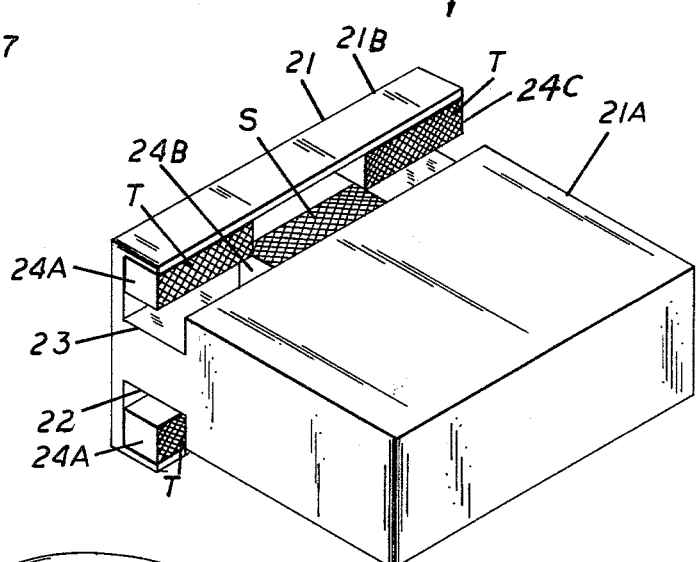
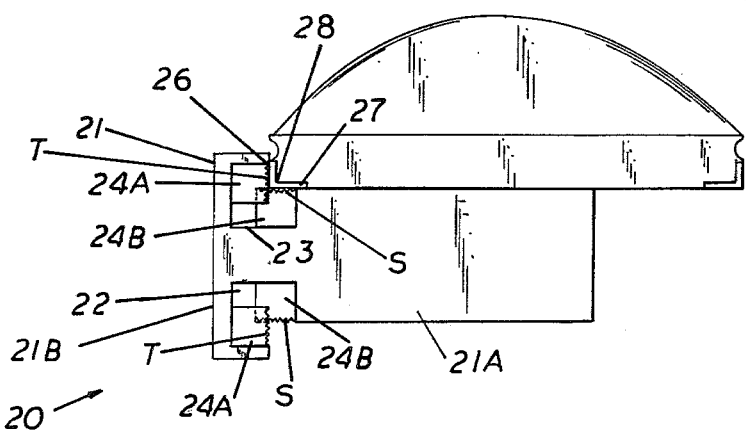
FIG. 4

SKI SHARPENER

PROBLEM AND PRIOR ART

Heretofore various effort have been made to develope a simple and practical sharpening device which is particularly suitable for sharpening the edge of a snow ski. Various sharpening devices have been conceived. One of the known types of such ski sharpeners as evidenced by U.S. Pat. No. 3,670,601 comprises a device which is constructed so that only one edge surface of a ski edge can be sharpened during a sharpening operation. Other sharpeners such as a sharpener evidenced by U.S. Pat. No. 3,875,825 are arranged with continuous filing surfaces disposed at right angles to operate both on the vertical and horizontal edge surface of a ski edge. However, it has been noted that with continuous filing surfaces disposed at right angles to define a corner file that there is a tendency of filing to accumulate in the juncture defined by the respective file surfaces defining such "corner" files. For this reason unless the juncture of the file is maintained clean at all times, there is a tendency for the ski edge to be honed with a "rounded" corner rather than a desired "sharp corner." Variations of the foregoing described ski sharpeners are evidenced by the constructions disclosed in U.S. Pat. Nos. 3,693,219; 3,834,250; 3,561,169; and U.S. Pat. No. 1,263,666.

OBJECT

An object of this invention is to provide an improved ski sharpener that is relatively simple in construction and positive in operation.

Another object is to provide a ski sharpener which will simultaneously hone the vertical and horizontal surfaces of a ski edge so as to positively form or maintain a "sharp" corner thereto.

Another object is to provide an improved ski sharpener having at least two sets of filing surfaces wherein each set of filing surfaces has a different degree of coarseness.

Another object is to provide an improved ski sharpener capable of honing a corner edge of a ski in a manner to assure that a sharp corner edge can be maintained.

Another object is to provide a ski sharpener which will simultaneously hone an external corner edge of a ski in a manner which will prohibit the accummulation of any filings in the juncture defined by the filing surfaces of the honing device.

BRIEF DESCRIPTION

The foregoing objects and other advantages are attained by a ski sharpener which comprises a base member having a base portion and a side portion disposed normal to one another and along which a plurality of file sections are longitudinally and vertically disposed to define two intermittent filing surfaces disposed at an angle defining a corner therebetween. The intermittent filing surfaces are disposed so as to engage the adjacent surfaces of a ski edge during a ski edge sharpening operation. The arrangement is such that during a honing or sharpening operation the intermittent filing surfaces effect a simultaneously filing of the adjacent surfaces of a ski edge without the accummulation of filings occuring at the plane of junction of the respective intermittent filing surfaces. The ski sharpener may be provided with one or more sets of intermittant filing surfaces. If more than one set of intermittent filing surfaces are provided, it is preferred that each set be of varying coarseness.

FEATURES

A feature of this invention resides in the provision of a relatively simple construction of a ski sharpener having a pair of intermittent filing surfaces disposed in angularly disposed planes to define a juncture therebetween which is arranged to prohibit the accummulation of any filing therebetween during a sharpening operation.

Another feature of this invention resides in a ski sharpener having a pair of angularly disposed intermittent filing surfaces arranged to simultaneously hone the adjacent corner surfaces of a ski edge during a sharpening operation.

Another feature of this invention is to provide a ski sharpener having more than one set of intermittent angularly disposed filing surfaces wherein each set of filing surfaces has varying degrees of coarseness.

Other features and advantages will become more readily apparent when considered in view of the drawings and descriptions in which:

FIG. 1 is a perspective view of a ski sharpener embodying the present invention.

FIG. 2 is a cross sectional view illustrating the application of the ski sharpener of FIG. 1 to a ski edge.

FIG. 3 is a perspective view of another modified embodiment of the invention.

FIG. 4 is a cross sectional view illustrating the application of the ski sharpener of FIG. 3 to a ski edge.

DETAIL DESCRIPTION

Referring to the drawings, there is shown in FIGS. 1 and 2 a ski sharpener 10 embodying the invention. As shown the ski sharpener 10 comprises a base member 11, which in the illustrated form has a base portion 11A and a connected side portion 11B. The base portion 11A is angularly disposed to the side portion 11B, and as shown are disposed normal to each other. Spaced along the junction defined by the base portion 11A and side portion 11B are a plurality of longitudinal file sections 12A, 12B, and 12C. The arrangement of the file sections 12A, 12B, 12C is such that every other section is longitudinally and vertically staggered so as to define two intermittent filing surfaces extending transversely of the base member 11. While three such file sections 12A, 12B and 12C are shown, it will be understood that the number of file sections can vary, as long as the staggered arrangement is maintained.

In the illustrated arrangement file sections 12A and 12C are suitably connected to the side portion 11B so as to be spaced above the base portion 11A. The file section 12B disposed in the space between sections 12A and 12C is suitably connected to the junction defined between base portion 11A and side portion 11B. Thus the top portions T and the side portions S of the respective file sections define an intermittent filing surface disposed in two angularly disposed planes so as to complement the adjacent surfaces 13 and 14 which define the edge 15 of a ski 16, as best seen in FIG. 2.

To maintain the intermittent filing surfaces defined by file sections 12A, 12B, and 12C "squared" with the ski edge 15, a spacer or guide 17 is suitably connected to the base portion 11A in spaced relationship to the file sections 12A, 12B, and 12C.

In the construction described, it will be apparant that when the sharpener is applied to a ski edge 15, that the file surfaces S and T of the respective file sections are alternately disposed in filing engagement with the adjacent surfaces 14 and 13 of the ski edge, respectively, so that a simultaneous honing of the edge surfaces can be effected. Also, because of the staggered arrangement of the respective file sections 12A, 12B, and 12C, there is not formed at the juncture of the filing plane a corner for accumulating filings. The filings if any will accumulate in the space 18 defined between adjacent file sections, and thereby insuring that the corner edge of the ski can be honed sharp.

FIGS. 3 and 4 illustrate another modified embodiment. In this form of the invention the ski sharpener 20 comprises a base member 21 which has a base portion 21A and a side portion 21B. As shown in FIG. 3, the base portion is provided with opposed recessed portions 22 and 23 disposed to either side of the base portion 21A and adjacent to the side portion 21B. Disposed in each of the recesses 22 and 23 are a plurality of staggered file sections 24A, 24B and 24C which are arranged as described with respect to FIGS. 1 and 2.

In the illustrated embodiment, the filing surface S of file sections 24 B and 24B is disposed at substantially the surface level of the enlarged body portion of the base 21A. The file surface T of the file sections 24 A and 24C is disposed in a plane angularly disposed to the plane of the file surface S. It will thus be apparent and as hereinbefore described the filing surfaces defined by file surfaces S and T define intermittent filing surfaces which are angularly disposed to complement the edge surfaces 26 and 27 of a ski edge. In the illustrated embodiment the filing surfaces S and T are disposed in normal planes.

In the embodiment of FIG. 3, the filing surfaces defined by the set of file sections disposed in recess 22 may have one degree of coarseness, and the filing surfaces of the file sections in recess 23 may be of a finer or different degree of coarseness. Therefore, with the sharpener of FIG. 3, a skier can hone his skis with varying degrees of filing coarseness.

As shown in FIG. 4, the enlarged portion of the base portion 21A functions as a spacer or guide for maintaining the filing planes or surface squared with the ski edge 28, regardless of which set of file sections is being used.

As previously described with respect to FIGS. 1 and 2, the operation of the ski sharpener of FIG. 3 is such that the adjacent surfaces of a ski edge can be sharpened simultaneously and without the accumulation of any filing occuring at the juncture of the respective filing planes as determined by surfaces S and T.

In view of the foregoing description, it will be readily understood and appreciated that variations and modifications may be made without departing from the spirit and scope of the invention.

What is claimed is:

1. A ski edge sharpener comprising a base member and file means mounted on said base member, said file means including a plurality of file sections staggered along said base member whereby said sections have complementary filing surface adapted to effect the simultaneous filing of the vertical and horizontal surfaces of a ski edge, said base member comprises a base portion and a connected side portion, said portions being disposed normal to one another and at least one file section being connected to said base portion in space relationship to said side portion, and at least one file section being connected to said side portion in spaced relationship to said base portion whereby the spacing of said file sections is such that the respective filing surfaces of said files engage the vertical and horizontal surfaces of a ski edge.

2. A ski sharpener as defined in claim 1 and including a spacer means connected to said base portion in spaced relationship to said side portion, said spacer means cooperating with said file section connected to said base portion to maintain said base portion parallel to the bottom of a ski during a sharpening operation.

3. A ski sharpener for honing a ski edge comprising a base member having a flat base portion adapted to extend parallel to the bottom surface of a ski and a side portion connected to the edge of said base portion and disposed at right angle thereto and which side portion is adapted to be disposed adjacent and parallel to a side edge of a ski, at least one file section connected to said base portion, said file section being spaced from said side portion, and a file section connected to said side portion which is spaced from said base portion, said file sections being disposed so that the side connected file section engages the vertical side edge of a ski and the base connected file section engages the horizontal bottom edge of a ski, and a spacer connected to said base portion for maintaining said base portion parallel to the bottom surface of a ski during a honing operation wherein both the vertical side edge and horizontal bottom edge of a ski are simultaneously honed by relative movement of said sharpener relative to the ski edge.

4. A ski sharpener comprising a base member having a base portion and a side portion disposed normal thereto, said base portion being disposed intermediate to said side portion, and a plurality of file sections disposed to each side of said base portion and adjacent to said connected side portion, said file sections disposed to one side of said base portion having a coarser filing surface than the file sections connected to the other side of said base portion, and a spacer means connected to said base portion for guiding and maintaining the filing surfaces of its respective filing sections when in use parallel to the surface of said ski.

5. A ski sharpener as defined in claim 4, wherein said base member is provided with a transverse recess extending along the side portion thereof and to each side of said base member; and said base portion defining a web connecting said spacer means to said side portion, said file sections being disposed in each of said recesses, said file sections in the respective recesses being spaced along the length thereof whereby the complementary filing surfaces of said file sections are disposed at right angles so as to simultaneously engage the vertical and horizontal edge portions of a ski edge, and the filing surfaces of the file sections disposed in one recess being coarser than the filing surfaces of the file sections in the other recess.

6. A ski sharpener as defined in claim 5 whereby the filing surfaces of the file sections disposed in each recess are longitudinally and vertically staggered and disposed normal to each other so as to be free of any junction defined between the filing surfaces of adjacent file sections to thereby prohibit the accumulation of any filings thereat.

* * * * *